(No Model.) 3 Sheets—Sheet 3.
W. B. CLARK.
BRAKE FOR STREET RAILWAY CARS.
No. 399,740. Patented Mar. 19, 1889.
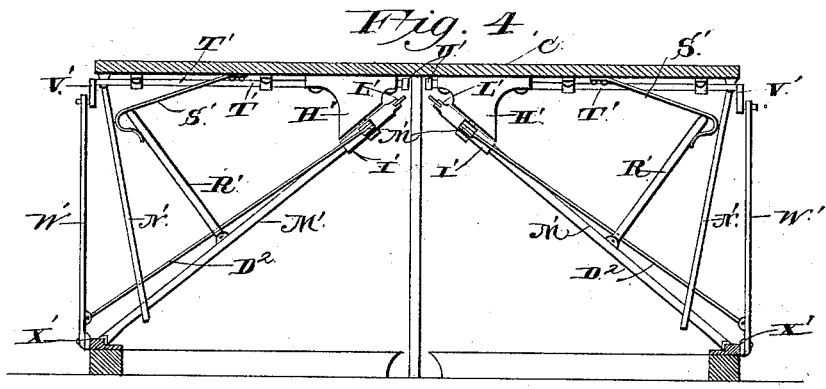
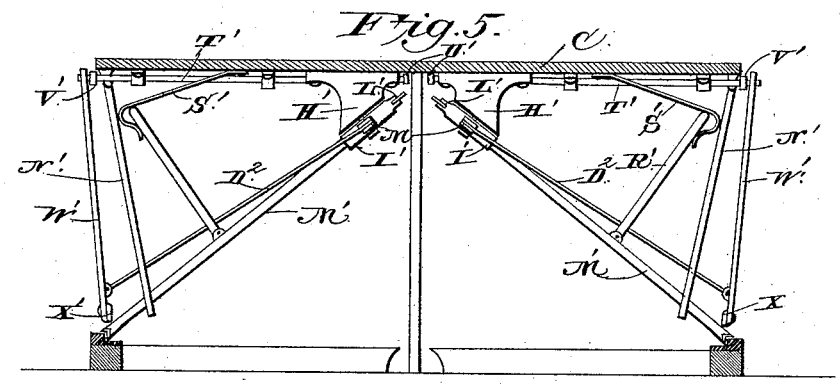
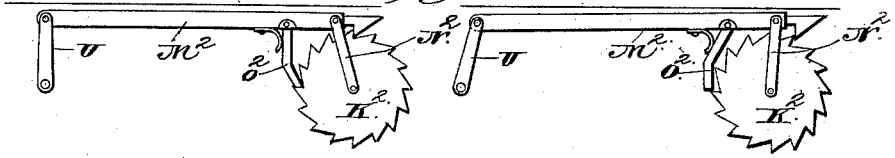
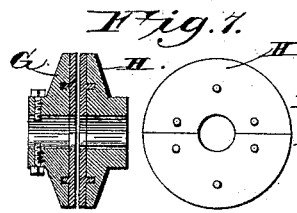
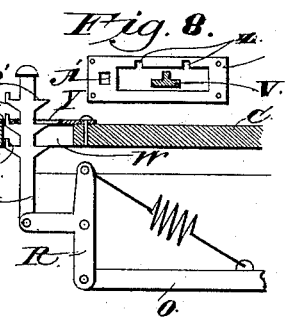
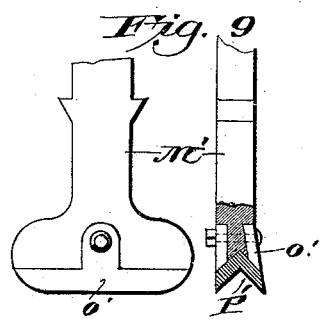
Witnesses
Inventor,
Walter B. Clark
By his Attorneys
N. PETERS, Photo-Lithographer, Washington, D. C.

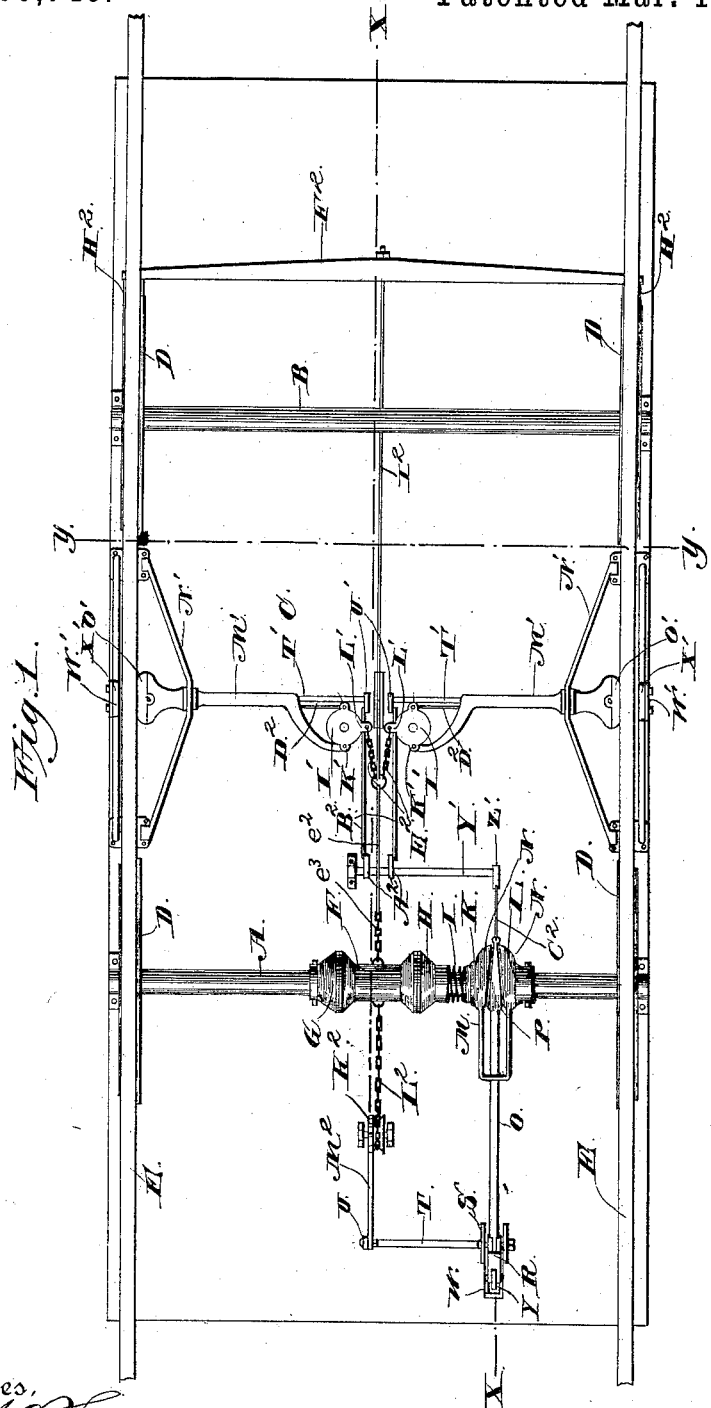

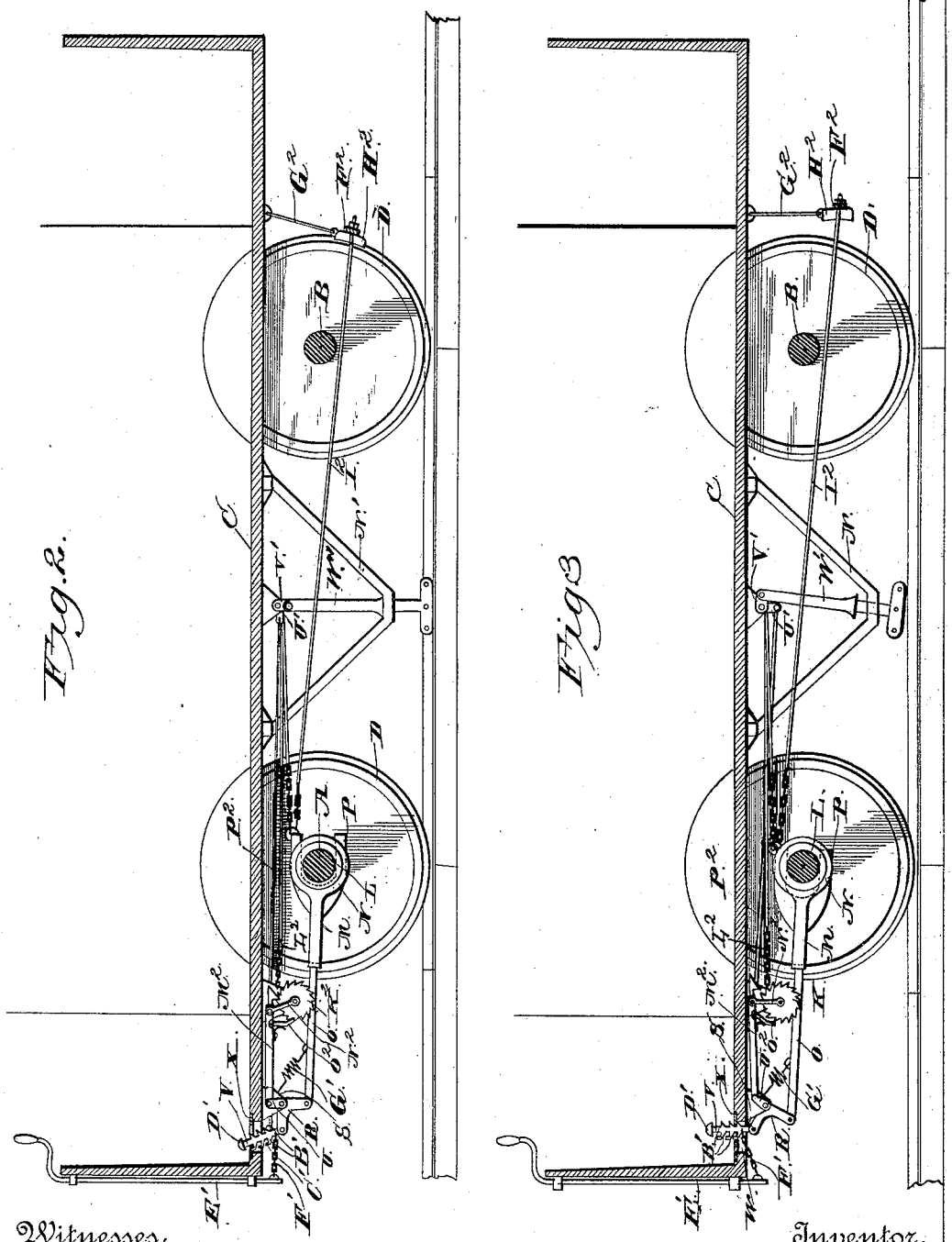

UNITED STATES PATENT OFFICE.

WALTER BRENT CLARK, OF COVINGTON, KENTUCKY.

BRAKE FOR STREET-RAILWAY CARS.

SPECIFICATION forming part of Letters Patent No. 399,740, dated March 19, 1889.

Application filed July 18, 1888. Serial No. 280,254. (No model.)

*To all whom it may concern:*

Be it known that I, WALTER BRENT CLARK, a citizen of the United States, residing at Covington, in the county of Kenton and State of Kentucky, have invented a new and useful Improvement in Brakes for Street-Railway Cars, of which the following is a specification.

My invention relates to an improvement in brakes for street-railway cars; and it consists in the peculiar construction and combination of devices, that will be more fully set forth hereinafter, and particularly pointed out in the claims.

In the accompanying drawings, Figure 1 is a bottom plan view of a car provided with the brake apparatus embodying my improvement. Fig. 2 is a vertical longitudinal section of the same, taken on the line $x\ x$ of Fig. 1. Fig. 3 is a similar view showing the brakes in another position. Fig. 4 is a vertical transverse sectional view taken on the line $y\ y$ of Fig. 1. Fig. 5 is a similar view showing the brakes in another position. Figs. 6, 7, 8, and 9 are detail views.

A B represent the axles of the car, which are journaled under the bottom of platform C thereof in the usual manner, and said axles are provided with the usual flanged wheels, D, which engage the track-rails E. On the axle A, at the center of the same, is loosely mounted a drum, F.

G represents a friction-collar, which is rigidly secured to the axle A and bears against one end of the drum, and H represents a similar friction-collar, which is loosely mounted on the axle, and is adapted to move toward and from the opposite end of the drum. A coiled spring, I, encircles the axle and bears against the outer end of the collar H, and a sliding collar, K, which is loose on the axle, bears against the outer end of said spring.

L represents a collar, which is rigidly secured to the axle A at a suitable distance from the collar K.

M represents a U-shaped yoke, the arms of which are journaled loosely on the axle A, bear between the collars K and L, and are provided with enlarged heads N, the opposing sides of which are oblique and arranged at opposite angles.

O represents a rod, which is guided through an opening in the central portion of the yoke, and has its inner end bifurcated and astride the axle A and provided with an enlarged head or cam, P, which is wedge-shaped, as shown in Fig. 1, and has its oblique sides bearing against the inner sides of the heads N of the yoke. The latter is made of resilient material, such as steel.

R represents a bell-crank lever, which is fulcrumed to a stud or support, S, that depends from the bottom of the car at a suitable distance from one corner thereof. The said bell-crank lever is rigidly secured to one end of a rock-shaft, T, said rock-shaft having at its opposite end an arm, U.

The front end of the rod O is pivotally connected to the downward-extending arm or to the bell-crank lever, and to the forward-extending arm of the bell-crank lever is pivotally connected a vertically-movable link or pin, V, which extends upward through an opening, W, in the bottom of the car. The said opening is partly covered by a plate, X, which is screwed or bolted on the bottom of the car, and has a rectangular longitudinal opening, Y, a pair of rectangular recesses, Z, which communicate with the opening Y, and near the front end of the plate is a small rectangular opening, A'. The pin or link V is T-shaped in transverse section, as illustrated in Fig. 8, and extends through the opening Y, and one of its ribs or flanges is adapted to engage either of the notches Z, so as to secure and guide the pin or link in a vertical direction when the upper end thereof is moved forward, and to guide and secure said pin in an inclined direction when the upper end thereof is moved backward. The said pin is further provided on its front and rear sides with the vertical series of oppositely-extending arms or stops B', and said arms or stops, which are on the front side of the pin, are provided at their front ends with upwardly-extending studs C', which are adapted to engage the opening A' in plate X, so as to secure the pin or link at any desired vertical adjustment, as will be readily understood by an inspection of Fig. 8. The upper end of said pin or link is provided with a head, D', which adapts the said pin or link to be depressed and disengaged from the plate X by the foot of the driver or brakeman on the car.

E' represents the usual crank-shaft, which is journaled in a vertical position on one end of the car, and is adapted to be rotated by the driver or brakeman, and the lower end of said crank-shaft is connected to the pin or link V by means of a chain, F′.

G′ represents a coiled retractile spring, which has one end connected to the rod O, and has its front end secured under the bottom of the car, the function of this spring being to normally draw the rod O forward, so as to cause the wedge-shaped head P thereof to disengage the arms of the yoke M, and consequently enable the arms of said yoke to approach each other, and thereby reduce the friction between the collar H and the drum F, so that the latter may remain stationary while the axle is in rotation and the car is in motion.

H′ represents a pair of brackets, which are bolted to the under side of the car, at the center thereof, and depend therefrom. The lower ends of said brackets are inclined upward toward each other, and on the said inclined end of the brackets are arranged cam wheels or levers I′, each of which is provided with three ears, K′, L′, and M′, which are arranged at angles of ninety degrees apart.

N′ represents a pair of swinging links, which are suspended from opposite sides of the car-bottom at the center of the same. The said links serve to suspend the outer end of a pair of brake-levers, M′, the inner ends of which are pivoted to the ears K′ of the cam-levers I′. To the outer ends of the brake-levers M′ are pivoted brake-blocks O′, which have right-angled longitudinal recesses P′ in their outer sides, adapted to fit the inner upper corners of the track-rails, as shown in Figs. 4 and 5. From the upper sides of the brake-levers M′, near the centers thereof, project arms R′, the upper ends of which bear under the outer ends of a pair of downwardly-extending spring-arms, S′, which are secured under the bottom of the car.

T′ represents a pair of rock-shafts, which have arms U′ at their inner ends and arms V′ at their outer ends. Said arms are arranged at right angles to each other, and said arms are journaled in line with each other under the center of the car. To the arms V′ of said rock-shaft are pivoted the upper ends of a pair of brake-levers, W′, which brake-levers have shoes X′ at their lower ends on their inner sides, which are adapted to bear against the outer sides of the track-rails, as shown in Figs. 1, 2, and 4.

Y′ represents a rock-shaft, which is journaled under the bottom of the car at a suitable distance in advance of the rock-shafts T′, and is provided at one end with an arm, Z′, and near the opposite end with a pair of arms, A², which are arranged at right angles to the arms Z′, and are connected to the arms U′ of rock-shaft T′ by means of rods B². The arm Z′ of rock-shaft Y′ is connected to the rod O by means of a rod, C².

D² represents a pair of rods, which connect the lower ends of the brake-levers W′ to the ears M′ of the cam-levers I′. To the ears L′ of the cam-levers are secured chains E², which unite and are connected to the drum F by a rod, $e^2$, and chain $e^3$.

From the foregoing description it will be understood that when the pin or link is depressed by the foot of the driver or brakeman the bell-crank lever R is turned so as to move the rod O rearward and cause the wedge-shaped end thereof to move the ends of the yoke M from each other, and thereby cause the spring I to exert so much pressure against the collar H as to clamp the drum F firmly between said collar and the collar G, and thereby cause the said drum to rotate with the axle A. The rearward movement of the rod O causes similar longitudinal movement in the rod C², which is connected thereto, and consequently causes said rod C² and arms Z′ of rock-shaft Y′ to partly turn said rock-shaft and cause the arms A² thereof to impart longitudinal movement to the rods B², and hence turn the rock-shafts T′ by the arms U′, and cause the arms V′ of said rock-shafts to lower the brake-levers W′ until the lower ends of said levers are in position to bear against the outer sides of the track-rails. The rotary motion of the drum F causes the same to wind the chains E² and thereby partly turn the cam-levers I′. Inasmuch as the brake-levers M′ and the rods D² are attached to opposite sides of the cam-levers I′, the latter when they are thus turned cause the said brake-levers M′ and rods D² to move in opposite directions, and thereby the shoes or blocks attached to the free ends of the said brake-levers and rods bear against both sides of the track-rails and clamp the same firmly between them, thus exerting so much friction on the track-rails as to instantly arrest the motion of the car. In order to maintain the brake in this position it is only necessary for the driver or brakeman to incline the pin or link V rearward and cause one of the arms D B′ thereof to engage the plate X.

F² represents a brake-beam of the usual construction, which is suspended from the car by a pair of links, G², and has blocks or shoes H², which are adapted to engage the flanges of the wheels on the axle B. The said brake-beam is connected to the drum by means of a rod, I², whereby when the said drum F is rotated to cause the brakes to be applied to the track, as before described, the brake-beam will be moved forward so as to cause the brake-shoes to engage the wheels on the rear axle, B, and assist in arresting the motion of the car.

K³ represents a ratchet-wheel, which is journaled to a suitable support under the car, near one end thereof, and has sprocket-teeth engaged by a chain, L², one end of which is attached to the arms U′ of rock-shafts T′. The other end of the said chain is attached to the drum F at a point opposite the ends of the chains E² and rod I².

M² represents a dog, which is pivoted to an arm, U, that projects from the shaft T. The said dog is adapted to engage the ratchet-wheel K², and has its outer end connected to the axis of the said ratchet-wheel by means of a link, N².

O² represents a spring-actuated pawl, which is pivoted to the dog and is adapted to engage the ratchet-wheel K².

When the rock-shaft T is in its normal position, (illustrated in Fig. 1,) with its arm U vertical, the link N² is turned to a vertical position, so as to raise the end of the dog out of engagement with the ratchet-wheel, and this causes the pawl O² to be inclined at such an angle that the point of said pawl disengages the ratchet-wheel also, thereby leaving the wheel K² free to turn, so that when the chain L² is tightened by the rotation of the drum F, when the brakes are applied, as before described, the dog will be unaffected by the wheel K². If the friction between the drum and the collars G H should not be sufficient to lock the drum to the axle with the required rigidity to quickly stop the car, or if from any other cause the brakes should fail to operate, the driver or brakeman will release the pin or link V from engagement with the plate X, and will work said pin or link vertically and impart reciprocating motion thereto, so as to lock the bell-crank lever R and the shaft T and cause the arm U of the latter to rock and impart reciprocating motion to the dog M². At each forward motion of the dog its point becomes lowered by the link N², as will be readily understood, and engaged with one of the teeth of the ratchet-wheel K², so as to partly rotate the said ratchet-wheel and cause the same to tighten the chain L², and thereby turn the cam-levers I' and cause the latter to apply the brake-levers to the track, in the manner before described.

The pawl O², which is pivoted to the dog, serves to prevent retrograde rotation of the ratchet-wheel at each rearward stroke of the dog when the point thereof is moving rearward on the upper side of the ratchet-wheel in order to engage another tooth thereof. The pin or link V is connected to the arm Z' of rock-shaft Y' by means of a rod, P², and, inasmuch as said link or pin is also connected to the crank-shaft E' by the chain F², the brakeman or driver, by rotating said crank-shaft, tightens and winds the chain F' thereon, and thereby moves the pin or link V forward, so as to cause the rod P² to partly turn the rock-shaft Y' and cause the connecting-rod B² to impart similar motion to the rock-shaft T', so as to elevate the brake-levers W' and cause the same to clear the outer side of the track-rails when it is not possible to use said levers W' in cases where the surface of the sheet is flush with the upper sides of the track-rails.

Having thus described my invention, I claim—

1. In a car-brake, the combination of the cam-levers, means, substantially as set forth, to operate the same, and the rods M', attached to the cam-levers, and having the shoes or blocks adapted to engage the inner upper sides of the track-rails, substantially as described.

2. In a car-brake, the combination of the cam-levers, the brake-levers M', connected thereto and extending outward therefrom, and adapted to engage the inner sides of the track-rails, the suspended brake-levers W', adapted to engage the outer sides of the track-rails, and the rods D², connecting said brake-levers to the cam-levers, substantially as described.

3. In a car-brake, the combination of the rock-shafts T', having the arms, the brake-levers W', pivotally connected to said arms and suspended therefrom, means, substantially as set forth, to apply said brake-levers to the track-rails and release them therefrom, and means, substantially as described, to turn the rock-shafts and thereby raise or lower the brake-levers.

4. In a car-brake, the combination of the cam-levers, the brake-levers M', pivotally connected thereto and adapted to engage the inner sides of the track-rails, the arms R', extending from said brake-levers, and the springs bearing on said arms, substantially as described.

5. In a car-brake, the combination, with the cam-levers, of the spring-depressed brake-levers M', connected thereto and adapted to engage the track-rails, substantially as described.

6. The combination of the car, the hinged yokes N', suspended from the same, the brake-levers M', guided and supported by said yokes and adapted to engage the track-rails, and means, substantially as specified, to operate the said brake-levers.

7. In a car-brake, the combination of axle, the drum loose thereon, the cam-lever, connections between the same and the drum, the brake-levers connected to and operated by the cam-lever, and the clutch devices to secure the drum to the axle, substantially as described.

8. The combination, in a car-brake, of the rock-shafts T', the brake-levers W', connected thereto, adapted to be raised and lowered thereby, and having the shoes X' to engage the track-rails, the cam-levers, the rods connecting the same to the brake-levers W' to operate the latter, the crank-shaft Y', and connections, substantially as set forth, between the same and the rock-shafts, substantially as described.

9. The combination, in a car-brake, of the brake-levers, the cam-lever connected thereto and adapted to operate the same, the ratchet-wheel K², the chain connecting said ratchet-wheel to the cam-lever to operate the latter, the rocking levers R, having the arms U, the dog M², connected to said arms and engaging the ratchet-wheel, the link connecting the free end of the dog to the axis of the ratchet-wheel, the spring-pressed pawl pivoted to the dog and adapted to engage the wheels, and means, substantially as set forth, to operate the rocking lever, substantially as described.

In testimony that I claim the foregoing as my own I have hereto affixed my signature in presence of two witnesses.

WALTER BRENT CLARK.

Witnesses:
JOS. F. ENDRES,
JAS. T. GREENWOOD.